(12) United States Patent
Hiramatsu

(10) Patent No.: US 7,848,210 B2
(45) Date of Patent: Dec. 7, 2010

(54) OPTICAL HEAD AND OPTICAL DISK APPARATUS

(75) Inventor: Takehiro Hiramatsu, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 454 days.

(21) Appl. No.: 11/964,320

(22) Filed: Dec. 26, 2007

(65) Prior Publication Data

US 2008/0159089 A1     Jul. 3, 2008

(30) Foreign Application Priority Data

Dec. 27, 2006   (JP) .............................. 2006-353368

(51) Int. Cl.
*G11B 7/12* (2006.01)

(52) U.S. Cl. .............................. 369/112.16; 369/112.28

(58) Field of Classification Search .............. 369/44.14, 369/112.01, 112.03, 112.16, 112.17, 112.19, 369/112.21, 112.28
See application file for complete search history.

(56) References Cited

U.S. PATENT DOCUMENTS

| | | | |
|---|---|---|---|
| 7,242,647 B2 | 7/2007 | Katayama | |
| 2003/0107979 A1* | 6/2003 | Kim et al. | 369/112.07 |
| 2003/0202453 A1* | 10/2003 | Cho et al. | 369/112.24 |
| 2004/0156302 A1* | 8/2004 | Nakata et al. | 369/112.17 |
| 2005/0135220 A1* | 6/2005 | Katayama | 369/112.16 |
| 2005/0237899 A1* | 10/2005 | Ikenaka et al. | 369/112.05 |
| 2005/0265152 A1 | 12/2005 | Hirai | |
| 2006/0013109 A1* | 1/2006 | Fujiwara et al. | 369/112.01 |
| 2006/0077784 A1* | 4/2006 | Kanaya et al. | 369/44.14 |
| 2006/0077809 A1 | 4/2006 | Makita et al. | |
| 2006/0245335 A1* | 11/2006 | Nagata et al. | 369/112.28 |

FOREIGN PATENT DOCUMENTS

| | | |
|---|---|---|
| CN | 1767014 A | 5/2006 |
| CN | 1801356 A | 7/2006 |
| EP | 1 524 654 A2 | 4/2005 |
| JP | 2002-42366 | 2/2002 |
| JP | 2004-158118 | 6/2004 |
| JP | 3604125 | 10/2004 |
| JP | 2005-141892 | 6/2005 |
| JP | 2005-339718 | 12/2005 |
| JP | 2006-100376 | 4/2006 |
| JP | 2006-134474 | 5/2006 |
| KR | 10-2006-0051246 | 5/2006 |
| KR | 10-2006-0051541 | 5/2006 |

\* cited by examiner

*Primary Examiner*—Wayne R Young
*Assistant Examiner*—Thomas D Alunkal
(74) *Attorney, Agent, or Firm*—Oblon, Spivak, McClelland, Maier & Neustadt, L.L.P.

(57) ABSTRACT

An optical head includes: a first optical element having an optical characteristic of reflecting a light of a first wavelength and transmitting lights of second and third wavelengths, on the first optical element the light of the first wavelength from a first light source being incident; and a second optical element having an optical characteristic of transmitting the light of the first wavelength, reflecting the light of the second or the third wavelength in a first polarization state and transmitting the light of the second or the third wavelength in a second polarization state, a first surface on which the light reflected by the first optical element is incident, a second surface on which the lights of the second and the third wavelengths from second and third light sources are incident, and a third surface emitting the first, the second and the third lights incident from the first and the second surfaces.

7 Claims, 5 Drawing Sheets

OPTICAL HEAD AND OPTICAL DISK APPARATUS

CROSS-REFERENCE TO RELATED APPLICATIONS

This application is based upon and claims the benefit of priority from the prior Japanese Patent Application No. 2006-353368, filed on Dec. 27, 2006 the entire contents of which are incorporated herein by reference.

BACKGROUND OF THE INVENTION

1. Field of the Invention

The present invention relates to an optical head and an optical disk apparatus capable of reading information from an optical disk by using lights of three wavelengths.

2. Description of the Related Art

In order to improve a recording density of an optical disk, a wavelength of a light used for reading/writing of information from the optical disk is becoming short. As a result, for the optical disk, there coexist different standards in which wavelengths different from each other are used. In other words, as the optical disk standards, there exist a CD, a DVD, an HD-DVD and the like in which an infrared light, a red light, and a blue light are used, for example. It is convenient if such optical disks of a plurality of standards can be read/written by a single optical disk apparatus. Accordingly, an optical disk apparatus capable of using lights of three wavelengths are developed (for example, see JP-A 2005-339718 (KOKAI)).

BRIEF SUMMARY OF THE INVENTION

As an optical disk is multilayered, it is becoming necessary to reduce a noise due to a reflected light from another reproduction layer. As a measure therefore, it is considered to increase an optical magnification. However, if the optical magnification is increased, an optical path length is required to be prolonged, and there is a possibility that the optical head becomes long or large. That is, decreasing an S/N ratio at a time of reproduction from a multilayered optical disk may goes against a request of downsizing the optical head.

In view of the above, an object of the present invention is to provide an optical head and an optical disk apparatus in which a simultaneous pursuit of decreasing an S/N ratio at a time of reproduction from a multilayered optical disk and downsizing an optical head is easy.

An optical head according to a mode of the present invention includes: a first light source emitting a first light having a first wavelength; a second light source emitting a second light having a second wavelength different from the first wavelength and a first polarization state; a third light source emitting a third light having a third wavelength different from the first and the second wavelengths and the first polarization state; a first optical element having an optical characteristic of reflecting a light of the first wavelength and transmitting lights of the second and the third wavelengths, on the first optical element the first light from the first light source being incident; a second optical element having an optical characteristic of transmitting the light of the first wavelength, reflecting the light of the second or the third wavelength in the first polarization state and transmitting the light of the second or the third wavelength in a second polarization state approximately perpendicular to the first polarization state, a first surface on which the first light reflected by the first optical element is incident, a second surface on which the second and the third lights from the second and the third light sources are incident, and a third surface emitting the first light incident from the first surface and the second and the third lights incident from the second surface; and an optical system leading the first, the second and the third lights emitted from the third surface to an optical disk.

DETAILED DESCRIPTION OF THE INVENTION

Hereinafter, embodiments of the present invention will be described with reference to the drawings.

First Embodiment

Figure 1:
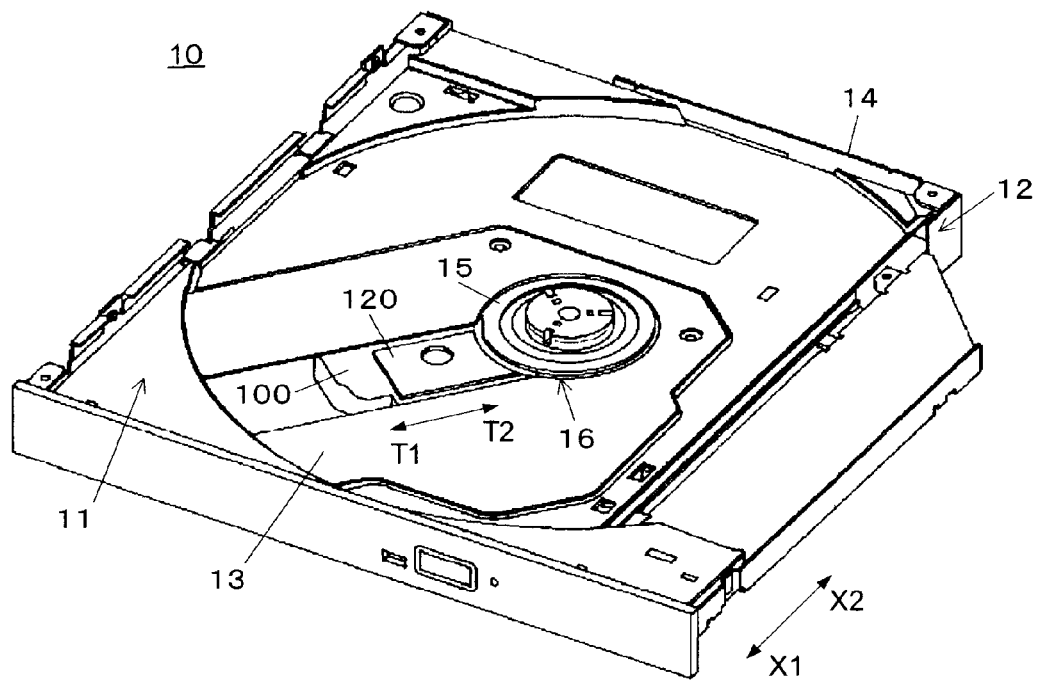
FIG. 1 is a perspective view showing an optical disk apparatus according to a first embodiment of the present invention.
Figure 2:
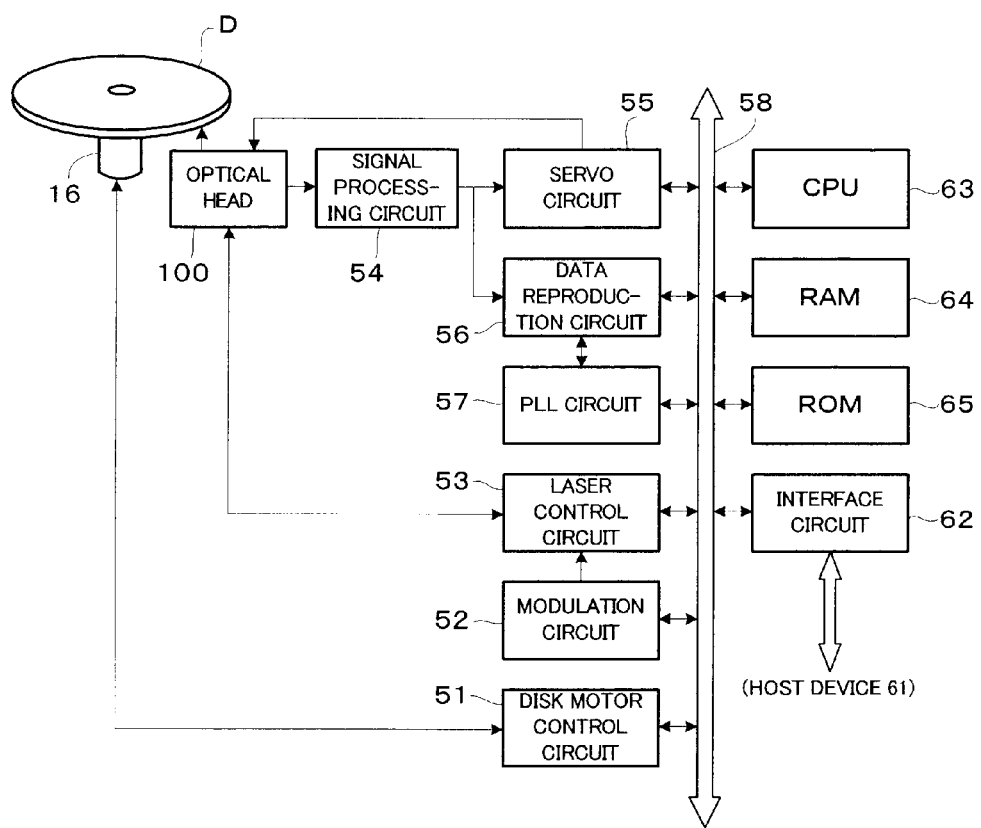
FIG. 2 is a block diagram showing an electrical configuration of the optical disk apparatus according to the first embodiment.

FIG. 1 is a perspective view showing an optical disk apparatus 10 according to a first embodiment of the present invention. FIG. 2 is a block diagram showing an electrical configuration of the optical disk apparatus 10.

The optical disk apparatus 10 is a thin structured drive apparatus mounted on a notebook personal computer or a book-type personal computer, for example, and has a drawer 11 and a cabinet 12. The drawer 11 mounts a recording/reproducing unit 13 for recording/reproducing information in/from an optical disc D. The cabinet 12 accommodates the drawer 11 and is constituted with an upper side cabinet (not shown) and a lower side cabinet 14. The lower side cabinet 14 is provided with a guide rail capable of ejecting or retracting the drawer 11 in an X1-X2 direction, and so on.

The recording/reproducing unit 13 has a turntable 15, a disk motor 16, and an optical head 100. The optical disk D is placed on the turntable 15 and rotated by the disk motor 16. The optical disk D is a recording medium capable of reading/writing of information by light, such as a CD, a DVD, and an HD-DVD-RAM, for example. The disk motor 16 is controlled by a disk motor control circuit 51.

The optical head 100 (also called "optical pickup") records/reproduces information in/from the optical disk D, and is moved in a radial direction (tracking direction T1-T2) of the optical disk D by a pickup feeding mechanism.

A modulation circuit 52 modulates data supplied from a host device 61 via an interface circuit 62 at a time of recording information, and provides the modulated data to a laser control circuit 53. The laser control circuit 53 supplies a writing signal to the optical head 100, based on modulated data supplied from the modulation circuit 52, at a time of recording information (at a time of forming a mark).

The optical head 100 irradiates a laser light to the optical disk D in correspondence with the signal supplied from the laser control circuit 53. On this occasion, an APC signal corresponding to an intensity of the laser light is outputted from the optical head 100 to the laser control circuit 53 so that writing signal is adjusted. An output signal based on a reflected light from the optical disk D is supplied to a signal processing circuit 54.

The signal processing circuit 54 generates a focus error signal and a tracking signal and outputs them to a servocircuit 55. A focusing control signal and a tracking control signal is outputted from the servocircuit 55. As a result, the laser light from the optical head 100 is controlled to follow up a track on a recording layer of the optical disk D and to be just focused. Additionally, the signal processing circuit 54 generates a reproduction signal of record data and outputs it to a data reproduction circuit 56.

The data reproduction circuit 56 reproduces the recorded data based on a reproduction clock signal from a PLL circuit 57. The reproduced data reproduced by the data reproduction circuit 56 is outputted to the host device 61 via an interface circuit 62.

The disk motor control circuit 51, the modulation circuit 52, the laser control circuit 53, the servocircuit 55, the data reproduction circuit 56, the PLL circuit 57 and the like are controlled by a CPU (Central Processing Unit) 63 via a bus 58.

The CPU 63 comprehensively controls this optical disk apparatus 10 according to an operation command supplied from the host device 61 via the interface circuit 62. Further, the CPU 63 uses a RAM (Random Access Memory) 64 as a work area and operates according to a program stored in a ROM (Read Only Memory) 65.

(Internal Configuration of Optical Head 100)

Figure 3:
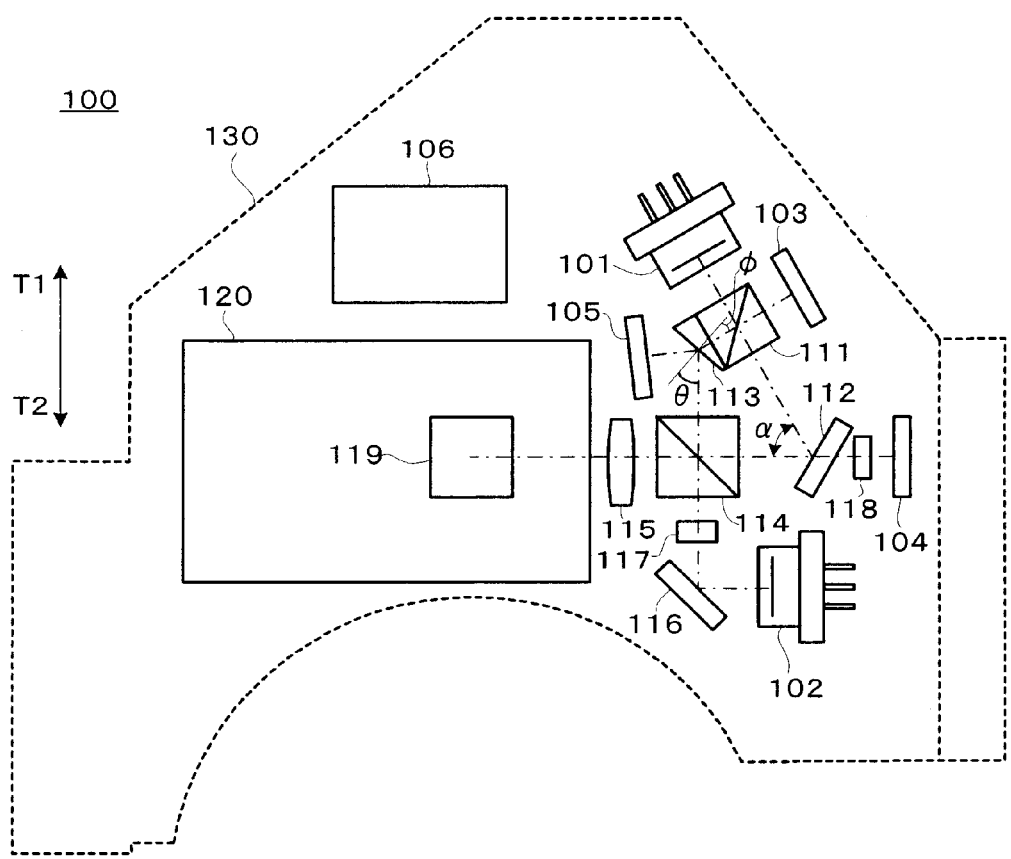
FIG. 3 is a top view showing an optical head according to the first embodiment.
Figure 4:
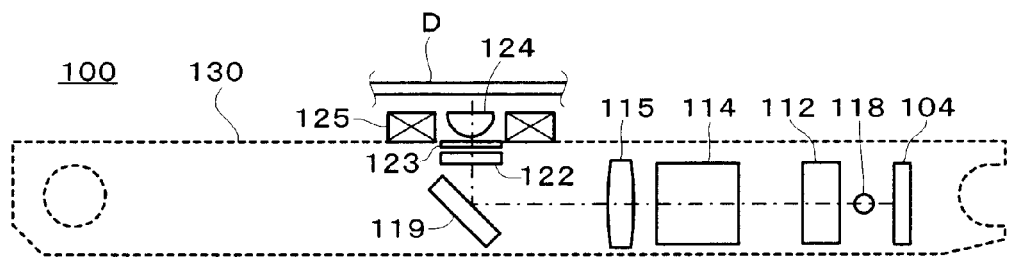
FIG. 4 is a side view showing the optical head according to the first embodiment.
Figure 5:
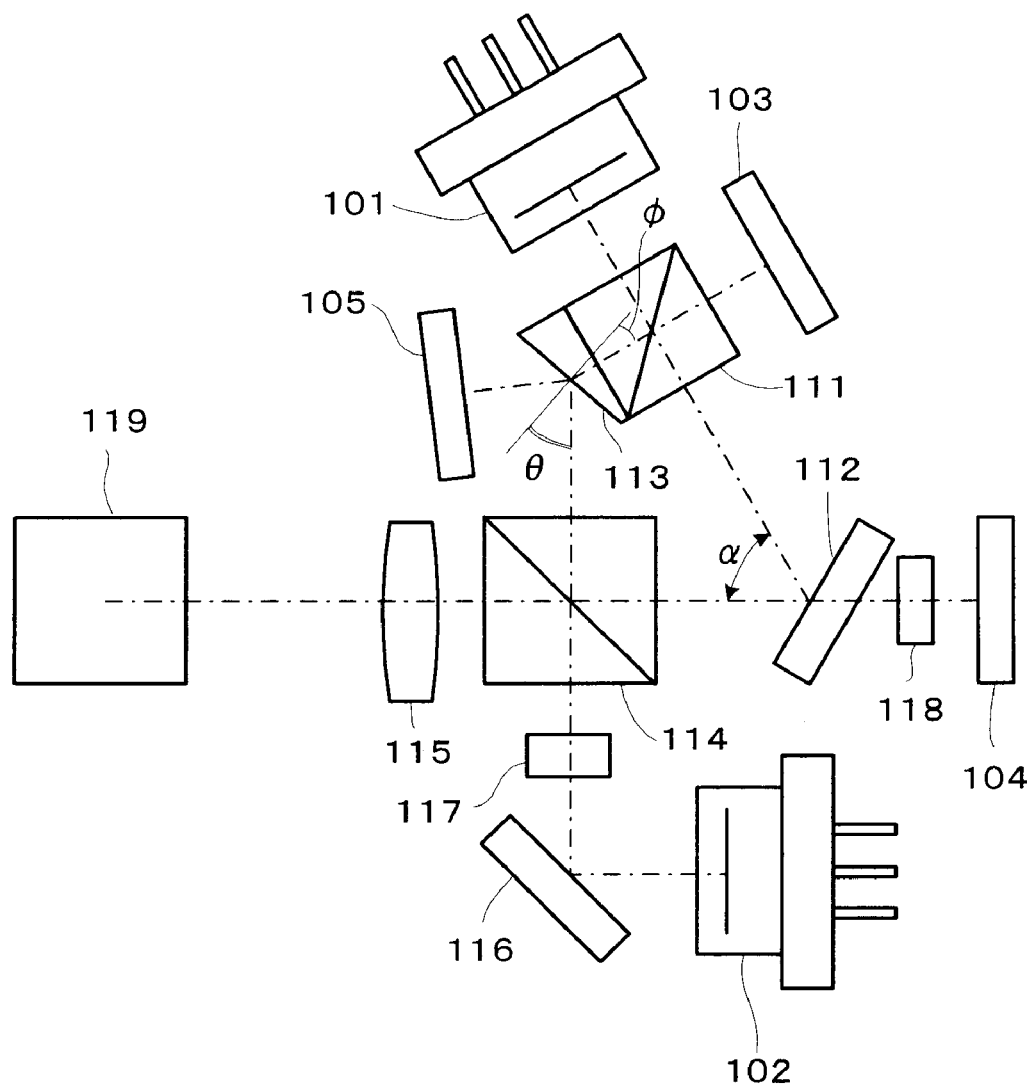
FIG. 5 is an enlarged view enlargedly showing an arrangement of optical components of FIG. 3.

An internal configuration of the optical head 100 will be described. FIG. 3 and FIG. 4 are a top view and a side view showing the optical head 100. FIG. 5 is an enlarged view enlargedly showing an arrangement of optical components of FIG. 3. Incidentally, a maximum outer shape of a base 130 is illustrated by a broken line for the sake of viewability.

The optical head 100 has a blue laser element 101, a two-wavelength laser element 102, a blue data light detector 103, a two-wavelength light detector 104, an APC light detector 105, an LDD 106, a PBS (Polarization Beam Splitter) 111, TMs (Trichroic Mirrors) 112, 113, a TP (Trichroic Prism) 114, a CL (Collimator Lens) 115, a DM (Dichroic Mirror) 116, a GT (Grating) 117, a CDL (Cylindrical Lens) 118, a PM (Perpendicularizing Mirror) 119, and an actuator unit 120. These blue laser element 101 and the like are disposed on the base 130 and movable in the radial direction of the optical disk D.

The blue laser element 101 is a first light source emitting a laser light of a first wavelength (approximately 405 nm (400 to 410 nm)), most of the laser light being in a second polarization state (p-polarization). However, the emitted light from the blue laser element 101 includes a light in a first polarization state. Approximately 95% (90 to 97%), for example, of this emitted light is in the second polarization state and approximately 5% (3 to 10%) is in the first polarization state. This is for the purpose of making part of the light from the blue laser element 101 reflected by the PBS 111. By varying a relative angle of the blue laser element 101 to the PBS, a ratio of the first and the second polarization states can be adjusted (the blue laser element 101 is rotated about the optical axis).

The two-wavelength laser element 102 is second and third light sources emitting laser lights of second and third wavelengths (approximately 650 nm (640 to 670 nm), approximately 780 nm (770 to 800 nm)), most of the laser lights being in the first polarization state (s-polarization). In other words, the two-wavelength laser element 102 is made of two light sources adjacently disposed and packaged. Incidentally, the second and the third light sources can be separate laser elements.

The polarization states of the blue laser element 101 and the two-wavelength laser element 102 are different since the polarization states are made to correspondent to optical characteristics of the PBS 111 and the TP 114. Basically, the former and the latter transmit the light of the first wavelength in the second polarization state (p-polarization) and reflect the lights of the second and the third wavelengths in the first polarization state (s-polarization), respectively. Accordingly, the emitted lights from the blue leaser element 101 and the two-wavelength laser element 102 respectively are basically in the second and the first polarization states.

Note that it is also possible that the polarization state of the light of the first wavelength passed through the PBS 111 is converted from the second polarization state to the first polarization state by using a λ/2 wavelength plate, for example. In such a case, the lights of the first to the third wavelengths incident on the TP 114 are to have the first polarization state. It is because optical components, except for an HOE 122 described later, on an optical path of after the PBS 111 do not have polarization dependence in the first wavelength.

The blue data light detector 103 detects the light of the first wavelength emitted from the blue laser element 101 and reflected by the optical disk D as a data light. In the blue data light detector 103, there are disposed a plurality of photodiodes, which receive the light reflected by the optical disk D and diffracted by the later-described HOE (Holographic Optical Element) 122. This is for generating the reproduction signal and the tracking signal.

The two-wavelength data light detector 104 detects the lights of the second and the third wavelengths emitted from the two-wavelength laser element 102 and reflected by the optical disk D as data lights. In the two-wavelength data light detector 104, there are disposed a plurality of photodiodes, which receive the light divided by the GT (Grating) 117, reflected by the optical disk D and given astigmatism by the CDL (Cylindrical Lens) 118. This is for generating the reproduction signal and the tracking signal.

The APC light detector 105 detects the lights of the first to third wavelengths. This is for controlling intensities of the lights emitted from the blue laser element 101 and the two-wavelength laser element 102 (APC (Automatic Power Control)).

The LDD (Laser Diode Drive) 106 is a drive circuit driving the blue laser element 101 and the two-wavelength laser element 102.

The PBS (Polarization Beam Splitter) 111 is an optical element which transmits the light of the first wavelength in the second polarization sate (p-polarization) and reflects the light of the first wavelength and in the first polarization state (s-polarization). The PBS 111 reflects part of the light from the blue laser element 101. This is for monitoring an intensity of the light emitted from the blue laser element 101. As described above, the light from the blue laser element 101 includes the light in the first polarization state. This light in the first polarization state is reflected by the PBS 111. For example, if a rate of the second and the first polarization states in the first wavelength is approximately 95% (90 to 97%) and approximately 5% (3 to 10%), approximately 95% (90 to 97%) of the light is transmitted and approximately 5% (3 to 10%) of the light is reflected.

The TM (Trichroic Mirror) 112 is an optical element which reflects the light of the first wavelength and transmits the lights of the second and the third wavelengths. The TM (Trichroic Mirror) 113 is an optical element which transmits the light of the first wavelength and reflects the lights of the second and the third wavelengths. The TM 113 has a triangle shape (emission surface inclining to the optical path) and refracts the transmitted light to change its direction. As a result, the directions of the transmitted light and the reflected light coincide with each other.

The TP (Trichroic Prism) 114 transmits the light of the first wavelength without depending on the polarization while functioning as a polarization beam splitter for the second and the third wavelengths. In other words, the TP 114 transmits the light of the first wavelength. Additionally, the TP 114 transmits the lights of the second and the third wavelengths in the second polarization state (p-polarization) and reflects the lights of the second and the third wavelengths in the first polarization state (s-polarization).

The TP 114 transmits part of the lights of the second and the third wavelengths from the two-wavelength laser element 102. This is for monitoring intensities of the lights emitted from the two-wavelength laser element 102. For example, approximately 95% (90 to 97%) of the light is reflected and approximately 5% (3 to 10%) of the light is transmitted. For example, by changing a relative angle of polarization directions of the lights of the second and the third wavelengths and the TP 114, a rate of reflectivity and transmittance can be adjusted (for example, the two-wavelength laser element 102 is rotated about an optical axis). It is also possible that the $\lambda/2$ wavelength plate is added to between the two wavelength element 102 and the TP 114 and this $\lambda/2$ plate is rotated about the optical axis).

The CL (Collimator Lens) 115 coverts the light emitted from the TP 114 into a collimated light.

The DM (Dichroic Mirror) 116 reflects the lights of the second and the third wavelengths.

The GT (Grating) 117 divides the incident light into three beams (one beam for signal reproduction and two beams for tracking compensation).

The CDL (Cylindrical Lens) 118 gives the incident light astigmatism. This is for tracking.

The PM (Perpendicularizing Mirror) 119 alters a direction of the incident light from the CL (Collimator Lens) 115 by 90 degree (perpendicularly erects light).

The actuator unit 120 has the HOE (Holographic Optical Element) 122, a QWP (Quarter Wavelength Plate) 123, an OL (Object Lens) 124 and an actuator 125.

The HOE (Holographic Optical Element) 122 has a wavelength selectivity characteristic and a polarization selectivity characteristic. In other words, the HOE 122 transmits the light of the first wavelength in the second polarization state (p-polarization) and diffracts the light of the first wavelength in the first polarization state (s-polarization). The HOE (Holographic Optical Element) 122 transmits the lights of the second and the third wavelengths.

The QWP (Quarter Wavelength Plate) 123 changes a phase of an incident light by ¼ wavelength. A first linearly polarized light (for example, p-polarized light, s-polarized light) incident on the QWP 123 is converted to a circularly polarized light, reflected by the optical disk D, incident on the QWP 123 again, and converted to a second linearly polarized light. On this occasion, polarization directions of the first and the second linearly polarized lights differ 90 degree from each other. In other words, the QWP 123 functions as an optical element converting the light in the first and the second polarization states (s-polarization, p-polarization) mutually.

The OL (Object Lens) 124 gathers the incident collimated light to the optical disk D, and conversely, converts the light reflected by the optical disk D to the collimated light.

The actuator 125 moves the OL 124 in vertical and horizontal (radial) directions of the optical disk D for focusing and tracking.

(Operation of Optical Head 100)

A. An Optical Path of the First Wavelength

An optical path of the first wavelength will be described. A laser light of the first wavelength, most of the laser light being in the second polarization state (p-polarization), is emitted from the blue laser element 101 and is incident on the PBS 111. (For example, approximately 95% is in the second polarization state and 5% is in the first polarization state). Most of the light incident on the PBS 111 is transmitted while part thereof is reflected. (For example, approximately 95% is transmitted and approximately 5% is reflected.) The light of the first wavelength reflected by the PBS 111 is incident on the TM 113. When emitted from the TM 113, the laser light is refracted and incident on the APC light detector 105. On the other hand, the light transmitted through the PBS 111 is reflected by the TM112 and thereafter transmitted through the TP 114.

The light of the first wavelength transmitted though the TP 114 is converted to the collimated light by the CL 115 and is incident on the actuator unit 120. The light of the first wavelength incident on the actuator unit 120 is reflected by the PM 119, transmitted through the HOE 122 and the QWP 123, and focused on the optical disk D by the OL 124.

The light reflected by the optical disk D is converted to the collimated light by the OL 124 and transmitted through the QWP 123. On this occasion, by the light being transmitted through the QWP twice in reciprocation, the polarization rotates by 90 degrees. Thus, the light is diffracted by the HOE 122 after being transmitted through the QWP 123.

The light transmitted through the HOE 122 is reflected by the PM 119, converted to the convergent light by the CL 115, transmitted through the TP 114, and reflected by the TM 112. The light reflected by the TM 112 is reflected by the PBS 111 and incident on the blue data light detector 103. Since the polarization of the light emitted from the TM 112 is different from that on the forward path by 90 degrees (perpendicular), the light emitted from the TM 112 is reflected by the PBS 111.

B. Lights of the Second and the Third Wavelengths

An optical path of the lights of the second and the third wavelengths will be described.

The lights of the second and the third wavelengths emitted from the two-wavelength laser element 102 is reflected by the DM 116 and divided into three beams (one beam for signal reproduction and two beams for tracking compensation) by the GT 117.

The lights of the second and the third wavelengths are emitted from the GT 117 and most thereof is reflected by the TP 114 while part thereof is transmitted. The light transmitted through the TP 114 is reflected by the TM 113 and incident on the APC light detector 105. The light reflected by the TP 114 is converted to the collimated light by the CL 115 and incident on the actuator unit 120.

The lights of the second and the third wavelengths incident on the actuator unit 120 are reflected by the PM 119, transmitted through the HOE 122 and the QWP 123, and focused on the optical disk D by the OL 124. The lights of the second and the third wavelengths reflected by the optical disk D are converted to the collimated lights by the OL 124 and transmitted through the QWP 123. On this occasion, by the lights being transmitted through the QWP 123 twice in reciprocation, the polarization rotates by 90 degrees.

After the lights of the second and the third wavelengths are transmitted through the QWP 123, the lights of the second and the third wavelengths are incident on the HOE 122 and transmitted without being diffracted. The lights transmitted through the HOE 122 are reflected by the PM 119 and converted to the convergent lights by the CL 115. After the lights are transmitted through the CL 115, the lights are transmitted through the TP 114 and transmitted through the TM 112 since the polarization thereof is different from that on the forward path by 90 degrees. The lights transmitted through the TM 112 are given astigmatism by the CDL 118 and incident on the two-wavelength data light detector 104.

C. Optical System of APC

An optical system of APC will be described.

As already described, part of a first light emitted from the blue laser element 101 is reflected by the PBS (Polarization Beam Splitter) 111. Part of second and third lights emitted from the two-wavelength laser element 102 is transmitted through the TP (Trichroic Prism) 114.

These lights of the first, the second and the third wavelengths are incident on the TM (Trichroic Mirror) 113. The TM 113 transmits the light of the first wavelength and reflects the lights of the second and the third wavelengths, and whereby makes directions of these light rays coincide with each other. The lights of the first to the third wavelengths emitted from the TM 113 are incident on the APC light detector 105 so that the intensities of the lights are monitored.

Here, a following formula (1) is formed.

$$\alpha = \phi + \theta$$

$$\sin\theta = n*\sin\phi = n*\sin(\alpha-\theta) \qquad \text{formula (1)}$$

α: twofold of a reflecting angle of the light of the first wavelength at the TM 112

φ: an incident angle of the light of the first wavelength at an emission surface of the TM 113

θ: a refracting angle of the light of the first wavelength at the emission surface of the TM 113

(a reflecting angle of the lights of the second and the third wavelengths at the TM 113)

n: a refractive index of components of the TM 113

If the reflecting angle α is 50 degree or less, the APC light detector 105 interferes with the actuator unit 120, while if the reflecting angle α is 80 degree or more, the blue data light detector 103 sticks out of the base 130. In other words, the reflecting angle α=50 to 80 degree. Accordingly, considering that the refractive index of a general material (glass) constituting the TM 113 is n=1.5, the exit angle θ is 30 to 50 degree.

(Advantage of Optical Head 100)

Hereinafter, advantages of the optical head 100 will be described.

(1) Securing of High S/N Ratio in a Multilayered Optical Disk D is Easy

When information is reproduced from a multilayered optical disk D, reflection of a light from a non-reproduction layer (a production layer different from a reproduction layer to be reproduced) becomes a cause of a noise. In other words, there is a possibility that the reflected lights from both the reproduction layer and the non-reproduction layer are incident on the blue data light detector 103 or the two-wavelength data light detector 104, reducing the S/N ratio (interlayer crosstalk).

As a countermeasure for the interlayer crosstalk, it is considered to increase an optical magnification. In other words, a size of an incidence range (beam spot) of the light from the non-reproduction layer in the blue data light detector 103 or the two-wavelength data light detector 104 is made sufficiently large in relation to sizes of light-receiving elements of the light detectors 103 and 104. As a result, an amount of the light incident from the non-reproduction layer to the light-receiving element is reduced so that the S/N ratio can be improved.

Here, necessity of increasing the optical magnification respectively in the first to the third wavelengths will be considered. The optical disks D to be reproduced in the first to the third wavelengths respectively are assumed to be the CD, the DVD, and the HD-DVD.

In the two-layered disk of the HD-DVD, since a distance between layers is small and the interlayer crosstalk is easy to become large, necessity of increasing the optical magnification is high (for example seven-fold or more).

On the other hand, for the CD, there is no need to increase the optical magnification. For the CD, a standard itself of the two-layered disk does not exist. Additionally, since a high-energy light is required for high-speed writing to the CD, it is preferable that the optical magnification is low to a certain degree. Since an interlayer distance in the DVD is larger than the interlayer distance in the HD-DVD, necessity of increasing the optical magnification is low as the countermeasure for the interlayer crosstalk (for example, six-fold or less is enough).

As described above, by increasing the optical magnification for the light of the first wavelength, it becomes possible to reduce the S/N ratio at a time of reproducing the multiple layered optical disk D with the light of the first wavelength.

(2) Downsizing of Optical Head (Small Size, Vibration Isolation)

Incidentally, in order to increase the optical magnification in the light of the first wavelength, it is necessary to increase an optical path length from the optical disk D to the blue data light detector 103. As a result, there is a possibility that the optical head becomes large and goes contrary to the requirement of downsizing. Further, if the optical head is made long in the radial direction, the optical head becomes easy to resonate and this resonance becomes a cause of instability of servo control.

In the optical head 100, the TM (Trichroic Mirror) 112 is disposed in a place appropriately apart from the CL (Collimator Lens) 115, to fold the optical path. As a result, the distance between the blue laser element 101 and the TM 112 is made appropriately short so that increase in size of the optical head 100 in the radial direction of the optical disk D is prevented. As a result, the resonance in the base 130 is reduced.

This is attributed to the fact that the optical components are disposed in an order of the blue laser element 101, the TM 112, the TP 114, and the CL 115. In other words, optical axes of the lights of the second and the third wavelengths are combined with the light of the first wavelength or divided from the light of the first wavelength at different positions on the forward path and on a return path, in the middle of the optical path of the light of the first wavelength. Such a disposition of the components becomes possible by using optical characteristics of the TM 112 and the TP 114 to the first to the third wavelengths.

If such optical characteristics are not used, the optical path of the light of the first wavelength is to be bent in a neighborhood of the CL 115, resulting in that the base becomes long in the radial direction of the optical disk D and the resonance becomes easy to occur.

As described above, the size of the optical head 100 is made to be appropriate to reduce the resonance in the base 130, and the stability of the servo control can be secured.

(3) Reduction of Number of Optical Components

Since the lights of the first to the third wavelengths are gathered to the single APC light detector 105, the number of the components for APC is reduced. By using the two-wavelength laser element 102 and the two-wavelength data light detector 104, the number of the components for the second and the third wavelengths is reduced. Incidentally, as will be described later, if the first and the second laser elements are disposed in an LDD 106 side, either one of the laser elements is disposed quite close to (for example, directly under) the LDD 106, and it is possible that temperature rise (thermal runaway) of a light-emitting element is produced.

(4) Prevention of Temperature Rise of Light-Emitting Element

There is disposed only the LD (blue laser element 101) of the first wavelength as the light-emitting element in the LDD 106 side, and whereby the temperature rise of the light-emitting element is prevented. If the LDs of the first and the second wavelengths are disposed in the neighborhood of the LDD 106, the distance between the LDD 106 and these LDs are close and heat release is reduced so that a temperature of the LD may rise. The temperature rise of the LD causes reduction of optical output thereof. In order to prevent the reduction of the optical output, more electric power is inputted to the LD to cause further temperature rise. In other words, there is a possibility that the temperature rise and increase of power consumption are repeated and the temperature goes up rapidly (thermal runaway). In particular, when large optical output is required such as in high-speed storage, the temperature rise as the above may be produced.

As stated above, disposing only the blue laser element 101 as the LDD 106 side light-emitting element, the temperature rise of the light-emitting element can be reduced.

As stated above, in the optical head 100 there are enhanced: (1) securing of high S/N ratio by reduction of the reflected light from the non-reproduction layer, (2) downsizing of the optical head (stabilization of the servo control by prevention of vibration), (3) reduction of the number of the optical components, and (4) prevention of the temperature rise of the light-emitting element. In particular, both the reduction of the S/N ratio at the time of the reproduction from the multilayered optical disk and the downsizing of the optical head are satisfied.

Second Embodiment

Figure 6:
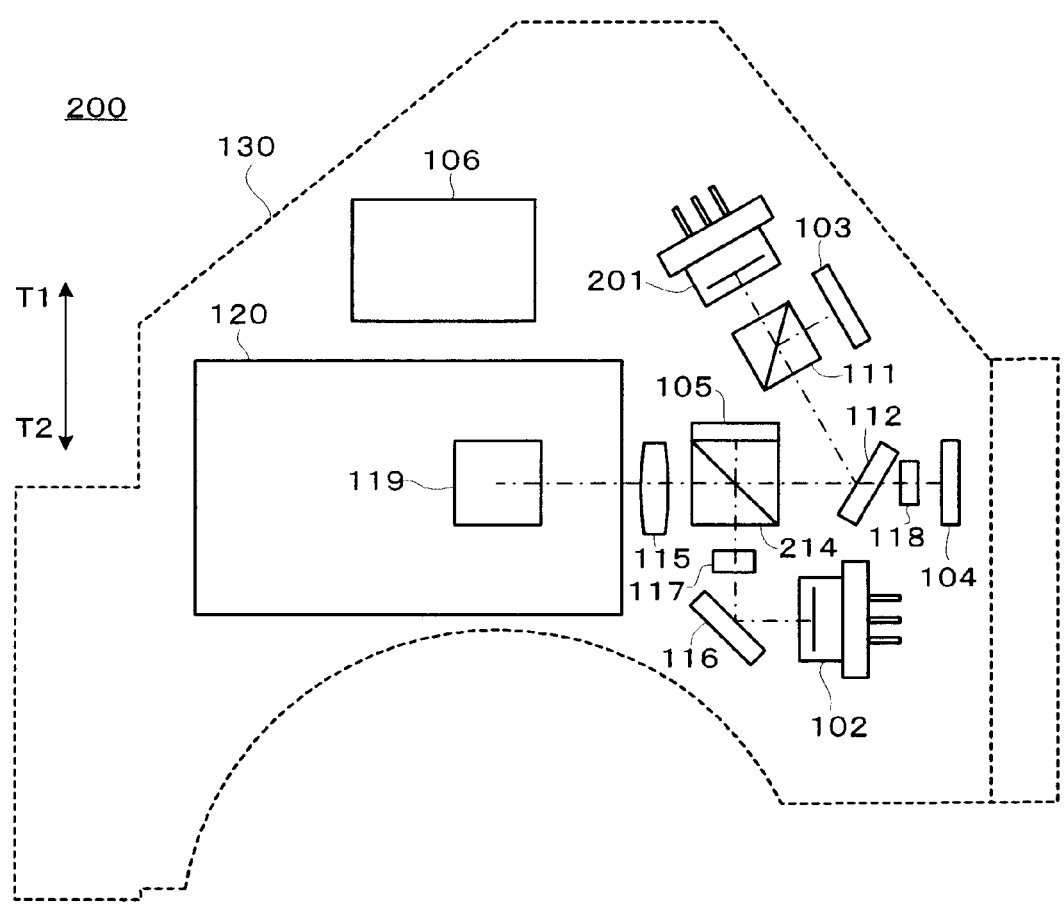
FIG. 6 is a top view showing an optical head according to a second embodiment.

A second embodiment of the present invention will be described. FIG. 6 is a top view showing an optical head 200 according to the second embodiment of the present invention. The optical head 200 is different from the optical head 100 of the first embodiment in following points.

(1) The optical head 200 does not have a TM 113.
(2) A blue laser element 201 and a TP 214 are disposed instead of the blue laser element 101 and the TP 114.
(3) An APC light detector 105 is disposed on a side surface of the TP 214.

A configuration of the optical head 200 is simplified than that of the optical head 100. These differences are generated by the fact that modes of APC are different in the optical heads 100 and 200.

As already described, in the optical head 100, part of the light of the first wavelength is reflected by the PBS 111 while part of the lights of the second and the third wavelengths is transmitted through the TP 114. These lights are transmitted/reflected through/by the TM 113 so that the lights are incident on the APC light detector 105.

On the other hand, in the optical head 200, part of the light of first wavelength is reflected by the TP 214 and part of the lights of second and third wavelengths is transmitted through the TP 214 and incident on the APC light detector 105.

The blue laser element 201 is a first light source emitting a laser light of the first wavelength (approximately 405 nm (400 to 410 nm)) in a second polarization state (p-polarization). Unlike the emitted light from the blue laser element 101, an emitted light from the blue laser element 201 is not required to include a light in a first polarization state. This is because it is not necessary to reflect the light from the blue laser element 201 by a PBS 111.

Incidentally, an element substantially the same as the blue laser element 101 can be used as the blue laser element 201. For example, the same element can be used as the blue laser elements 201 and 101 by differing angles in relation to the PBS 111.

A TP (Trichroic Prism) 214 transmits all of the light of the first wavelength in the first polarization state (s-polarization), transmits most of the light in the second polarization state (p-polarization), reflecting part thereof. Further, the TP 214 transmits all of the lights of the second and the third wavelengths in the second polarization state (p-polarization), reflects most of the lights of the second and the third wavelengths in the first polarization state (s-polarization), transmitting part thereof. It is in order that intensities of the lights emitted from the blue laser element 101 and the two-wavelength laser element 102 are monitored that the TP 214 reflects part of the light of the first wavelength in the second polarization state and transmits part of the lights of the second and the third wavelengths in the first polarization state. For example, for the first wavelength, approximately 95% (90 to 97%) of the light is transmitted and approximately 5% (3 to 10%) of the light is reflected. For the second wavelength, approximately 95% (90 to 97%) of the light is reflected and approximately 5% (3 to 10%) of the light is transmitted.

The optical head 200 is not substantially different from the optical head 100 in other points, and a detailed description will be refrained.

Other Embodiments

The embodiment of the present invention is not limited to the above embodiment and can be expanded or modified, and an expanded or modified embodiment is included in the technical scope of the present invention.

What is claimed is:

1. An optical head, comprising:
   a first light source emitting a first light having a first wavelength and a second polarization state;
   a second light source emitting a second light having a second wavelength different from the first wavelength and a first polarization state approximately perpendicular to the second polarization state;
   a third light source emitting a third light having a third wavelength different from the first and the second wavelengths and the first polarization state;
   a first optical element having an optical characteristic of reflecting a light of the first wavelength and transmitting lights of the second and the third wavelengths, on said first optical element the first light from said first light source being incident;
   a second optical element having an optical characteristic of transmitting the light of the first wavelength, reflecting the light of the second or the third wavelength in the first polarization state and transmitting a light of the second or the third wavelength in the second polarization state, a first surface on which the first light reflected by said first optical element is incident, a second surface on which the second and the third lights from said second and said third light sources are incident, and a third surface emitting the first light incident from the first surface and the second and the third lights incident from the second surface, said second optical element reflecting a part of the first light from the first light source and transmitting a part of the second and the third lights from the second and the third light sources;

an optical system leading the first, the second and the third lights emitted from the third surface to an optical disk;

a third optical element converting a polarization state of the second and the third lights reflected by the optical disk from the first polarization state to the second polarization state, said third optical element converting a polarization state of the first light reflected by the optical disk from the second polarization state to the first polarization state, said third optical element being disposed between the optical disk and said second optical element;

a fourth optical element transmitting a light in the second polarization state and reflecting a light in the first polarization state, said fourth optical element being disposed between said first light source and said first optical element;

a first light-receiving element receiving the first light reflected by the optical disk, transmitted through said second optical element and reflected by said first and said fourth optical elements;

a second light-receiving element receiving the second and the third lights reflected by the optical disk, converted in the polarization state by said third optical element and transmitted through said second and said first optical elements; and a third light-receiving element receiving the part of the first light reflected by said second optical element and the part of the second and the third lights transmitted through said second optical element.

2. An optical head, comprising:

a first light source emitting a first light having a first wavelength and a second polarization state;

a second light source emitting a second light having a second wavelength different from the first wavelength and a first polarization state approximately perpendicular to the second polarization state;

a third light source emitting a third light having a third wavelength different from the first and the second wavelengths and the first polarization state;

a first optical element having an optical characteristic of reflecting a light of the first wavelength and transmitting lights of the second and the third wavelengths, on said first optical element the first light from said first light source being incident;

a second optical element having an optical characteristic of transmitting the light of the first wavelength, reflecting the light of the second or the third wavelength in the first polarization state and transmitting a light of the second or the third wavelength in the second polarization state approximately perpendicular to the first polarization state, a first surface on which the first light reflected by said first optical element is incident, a second surface on which the second and the third lights from said second and said third light sources are incident, and a third surface emitting the first light incident from the first surface and the second and the third lights incident from the second surface, said second optical element transmitting a part of the second and the third lights from the second and the third light sources;

an optical system leading the first, the second and the third lights emitted from the third surface to an optical disk;

a third optical element converting a polarization state of the second and the third lights reflected by the optical disk from the first polarization state to the second polarization state, said third optical element converting a polarization state of the first lights reflected by the optical disk from the second polarization state to the first polarization state, said third optical element being disposed between the optical disk and said second optical element;

a fourth optical element transmitting a light in the second polarization state and reflecting a light in the first polarization state, said fourth optical element reflecting a part of the first light from said first light source, said fourth optical element being disposed between said first light source and said first optical element;

a first light-receiving element receiving the first light reflected by the optical disk, transmitted through said second optical element and reflected by said first and said fourth optical elements;

a second light-receiving element receiving the second and the third lights reflected by the optical disk, converted in the polarization state by said third optical element and transmitted through said second and said first optical elements; and a third light-receiving element receiving the part of the first light reflected by said fourth optical element and the part of the second and the third lights transmitted through said second optical element.

3. The optical head as set forth in claim 1,
wherein the first, the second and the third wavelengths are 400 nm or more to 410 nm or less, 640 nm or more to 670 nm or less, and 770 nm or more to 800 nm or less, respectively.

4. An optical disk apparatus comprising the optical head as set forth in claim 1.

5. The optical head as set forth in claim 2,
further comprising a fifth optical element transmitting the part of the first light reflected by said fourth optical element and reflecting the part of the second and the third lights transmitted through said second optical element,
wherein said third light-receiving element receives the first light transmitted through said fifth optical element and the second and the third lights reflected by said fifth optical element.

6. The optical head as set forth in claim 2,
wherein the first, the second and the third wavelengths are 400 nm or more to 410 nm or less, 640 nm or more to 670 nm or less, and 770 nm or more to 800 nm or less, respectively.

7. An optical disk apparatus comprising the optical head as set forth in claim 2.

* * * * *